Figure 1:
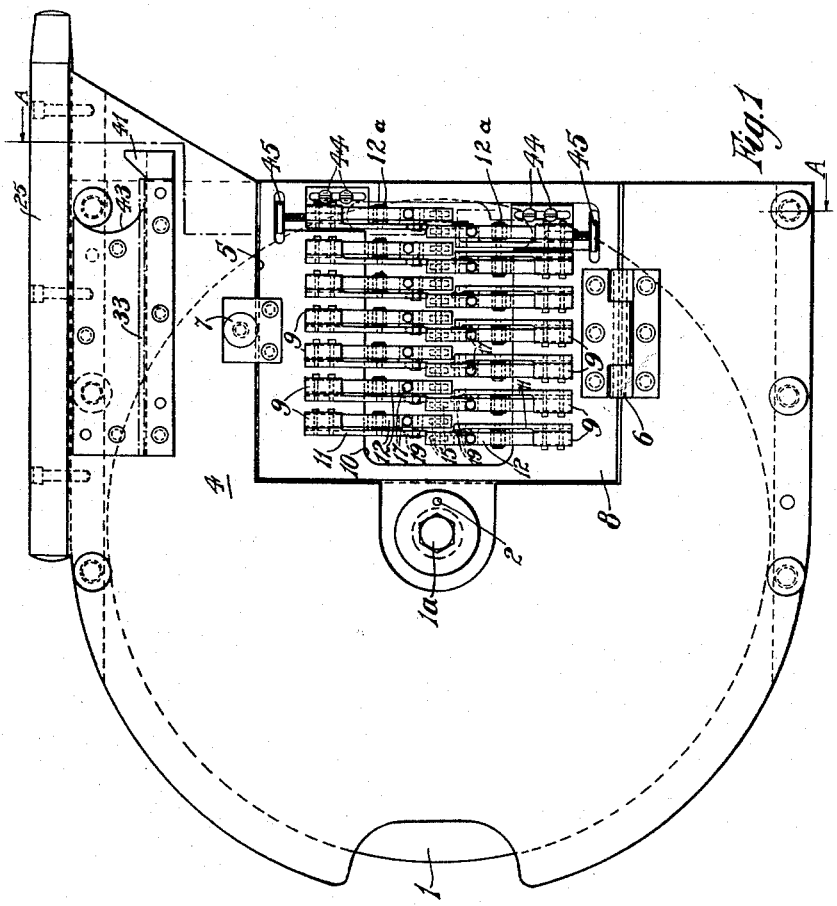

March 30, 1965 A. J. COX 3,176,090
PROGRAMING DEVICE FOR OPERATING A CONTROL
CIRCUIT OF AN AUTOMATIC MACHINE
Filed Dec. 5, 1960 4 Sheets-Sheet 1

INVENTOR
ALAN JOHN COX
Norris & Bateman
ATTORNYS

United States Patent Office 3,176,090
Patented Mar. 30, 1965

3,176,090
PROGRAMING DEVICE FOR OPERATING A CONTROL CIRCUIT OF AN AUTOMATIC MACHINE
Alan John Cox, Birmingham, England, assignor to The Birmingham Small Arms Company Limited, Birmingham, England, a British company
Filed Dec. 5, 1960, Ser. No. 73,871
Claims priority, application Great Britain, Dec. 11, 1959, 42,112/59
4 Claims. (Cl. 290—46)

This invention relates to control devices for automatic machines, for example automatic machine tools. Such machines are commonly controlled by an electric switch or switches for initiating the operation or operations to be performed, and cam means for actuating the switch or switches. Where several switches are involved, the cam means is frequently a set of cams, one engaging each switch, profiled to actuate the switch at one or more desired points in its rotation. Such cams have to be produced by special machining, and are applicable only for the control of one sequence of operations of the machine. An alternative arrangement is a set of abutments or trigger members adjustably mounted on a rotatable drum, and axially spaced for engaging the various switches as the drum is rotated. The abutments are set at different angular positions so as to actuate the switches at the desired points in the rotation of the drum. Although with this system the same drum and abutments can be used for controlling any sequence of operations, the abutments must be set specially for a particular desired sequence, which is a time-consuming operation.

According to the present invention a control device for an automatic machine comprises a movable member for initiating, when moved, a desired operation or operations of the machine, a disc of substantially rigid but ductile material arranged for rotation in synchronism with the machine, the disc being deformed at one or more parts in such manner that when it is rotated its deformed part or parts will engage and move the movable member so as to initiate the said operation or operations, the deformed part or parts being angularly positioned on the disc so as to engage and actuate the movable member at predetermined points in the operating cycle of the machine.

The disc is normally synchronised so as to execute one complete revolution during a complete cycle of operations of the machine, and for this purpose it may conveniently be mounted on a rotary shaft of the machine, where such a shaft is available or can be provided.

The movable member is preferably the operating part of an electric switch connected to a circuit controlling the said operation or operations of the machine or is coupled to such an operating member. Preferably a switch of the type commonly known as a "micro-switch" is used, which requires only a small movement of its operating part, and for use with such switches a convenient form of deformation of the disc is a dimple on one side, forming a corresponding raised portion on the other side for engagement by the movable member.

For controlling a number of different operations of the machine, at different points in its operating cycle, several movable members are provided, each arranged to initiate one or more operations, radially spaced with respect to the disc which is deformed at similar radial distances from its center and at appropriate angular positions for engaging the respective movable members at the desired points of the operating cycle.

With this system, although the disc is limited to the control of one particular sequence of operations of a machine, it can be produced more easily and quickly than the previously-mentioned set of profiled cams, and can be arranged to be easily mountable and detachable so that resetting the machine for another sequence of operations simply involves the removal of one disc and its replacement by another. The first disc can be retained and if it is desired to revert to the original sequence of operations can be replaced in the machine.

The control device preferably includes means for producing deformations of the disc at desired positions. By this means, for initial setting, a setter can simply fit a plane disc in the device, actuate the machine by hand or other means to perform the desired operations, and at the point at which each operation is to commence can actuate the means for producing a deformaion of the disc. At the completion of these operations the disc will be appropriately deformed to cause the machine to repeat them as desired.

Figure 2:
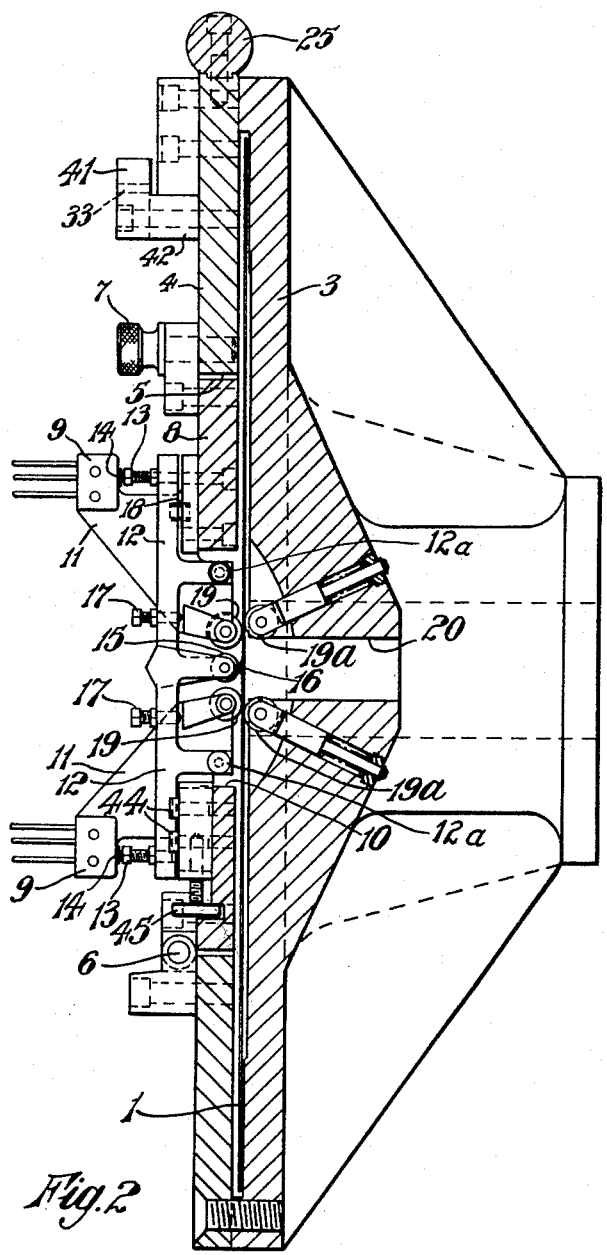
Figure 3:
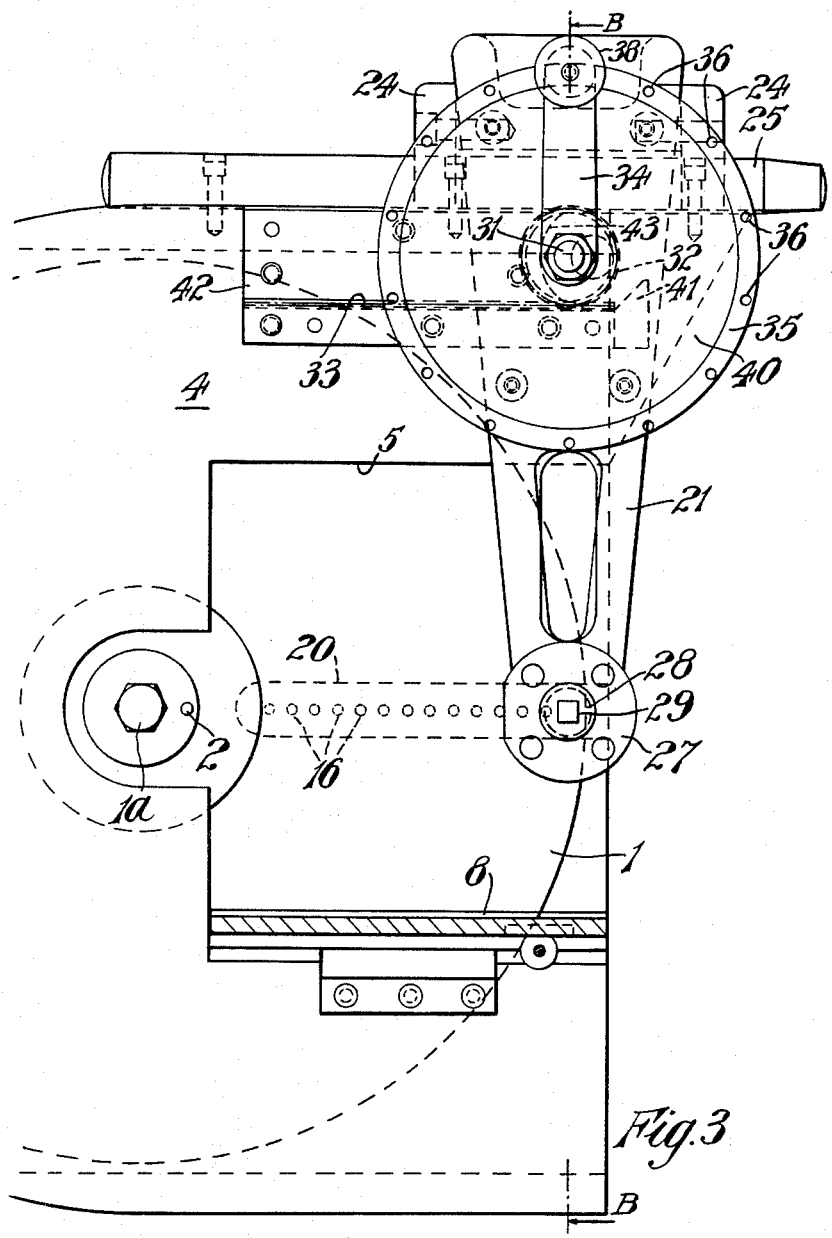
Figure 4:
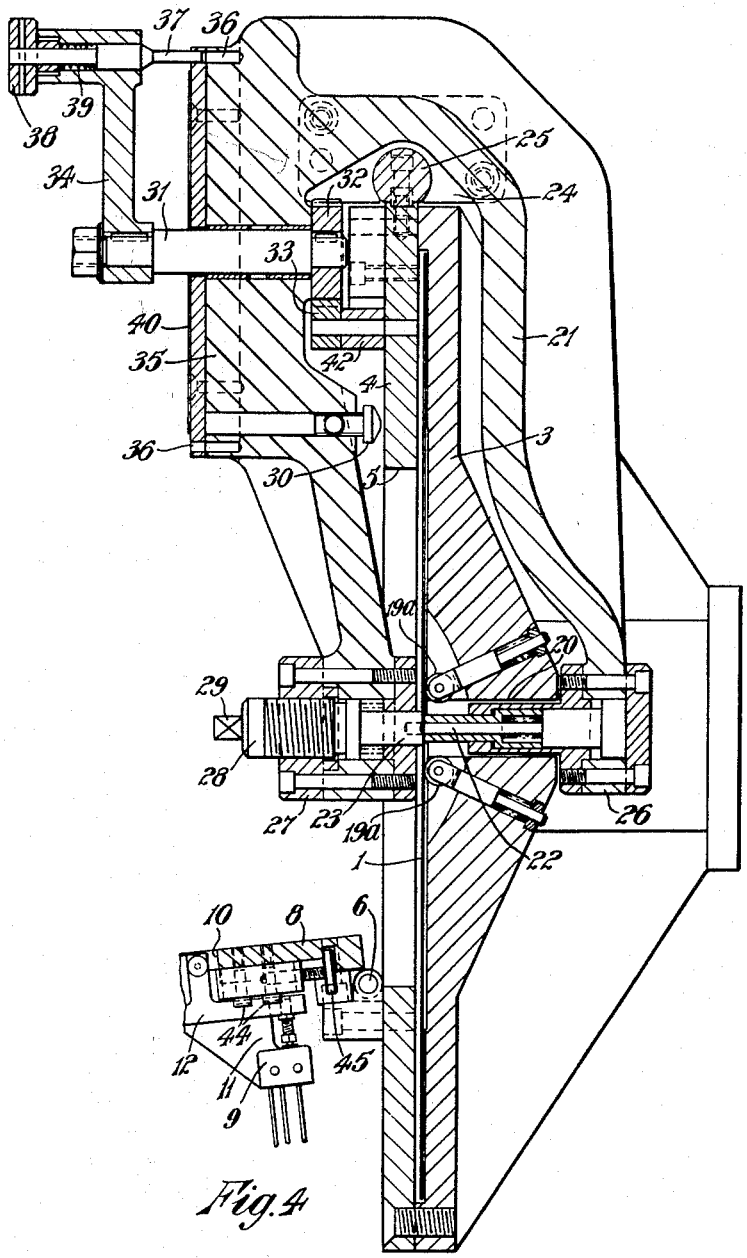

An embodiment of the invention is illustrated by way of example by the accompanying drawings, in which:

FIGURE 1 is an elevation of a control device.
FIGURE 2 is a section on the line A—A of FIGURE 1.
FIGURE 3 is a partial view similar to FIGURE 1 showing a device for deforming the disc in operative position.
FIGURE 4 is a section on the line B—B of FIGURE 3.

Referring first to FIGURES 1 and 2 the device comprises a circular disc 1 of sheet metal, for example sheet steel to be mounted on the end of a rotary shaft of the machine, by a screw 1a and angular location peg 2. The shaft selected for mounting the disc is one which makes one complete revolution for each complete cycle of operations of the machine. A casing surrounds the disc, and comprises a rear part 3 having a boss for mounting on the machine, around the said shaft, and a front part 4 having an aperture 5 in which is mounted, by a hinge 6 and screw 7, a plate 8 carrying a number of micro-switches 9 for connection to electrical control circuits of the machine. In this embodiment fourteen different operations, such as speed changes, tool and work piece feeds and the like, are required in a complete operational cycle of the machine, so fourteen switches 9 are provided.

The micro-switches 9 are mounted in two rows on opposite sides of a radial opening 10 in the plate 8, and as shown in FIGURE 2, each switch is carried on a bracket 11 secured to the plate. Pivotally mounted by a pin 12a on each bracket 11 is a lever 12 one end of which carries an adjustable screw 13 for engaging the operating button 14 of the switch, and the other end carries a follower roller 15 for engagement by a deformation of the disc, as will be described. As seen in FIGURE 1, the brackets 11 are staggered along the opening 10 so that the follower rollers are substantially equally spaced along a radius of the disc.

For effecting operation of the switches, to initiate the various operations controlled by them, the disc is deformed at appropriate radial and angular positions. As shown in FIGURE 2 each deformation comprises a dimple 16 formed on the rear of the disc so as to produce a raised portion on the front surface—that is the surface directed towards the follower rollers 15. The dimple or dimples for actuating each switch is/are formed at the appropriate radial distance from the center of the disc to engage the follower roller 15 of that switch and at angular position or positions relative to the location peg 2 such as to engage the roller at the desired point or points in the operational cycle of the machine.

The rollers 15 are preferably held just clear of the surface of the disc by screws 17 in the levers 12 so as to reduce friction and wear but are, of course, sufficiently close to the surface to be engaged by the raised portions. They are urged towards the disc by springs 18 between the levers 12 and brackets 11.

To avoid spurious actuation of the switches due to warping or other distortion of the disc, the portion of the disc immediately adjacent to the follower rollers 15 is supported by fixed support rollers 19 mounted in each bracket to engage and provide a location for the surface of the disc, and spring loaded rollers 19a are mounted in the rear part 3 of the casing, to urge the disc towards the support rollers 19. To avoid interference with the dimples, the support rollers 19 are arranged between the adjacent follower rollers 15, and thus the dimples pass on either side of them as the disc is rotated.

Although the desired position of the various dimples 16 in the disc may be determined by angular and radial measurements and the dimples could then be formed by a hand punch or by other means, it is preferable to form them in the disc when it is mounted in position on the machine it is to control. FIGURES 3 and 4 show the control device with an attachment in position for forming the dimples.

To allow access to the disc for this purpose the plate 8 carrying the switches and auxiliary parts is swung out of the opening, after releasing the screw 7, and is supported in the "open" position by its hinge 6 as shown in FIGURE 4. In the rear part 3 of the casing a radial opening 20 is formed with its axis on the radius along which the follower rollers 15 are arranged, to provide access for the rear part of the dimple-forming attachment.

The dimple-forming attachment comprises a roughly U-shaped member 21 for straddling the disc and carrying at the ends of its limbs respectively a punch 22 and an anvil 23 for operating on the disc. The U-shaped member 21 has secured to its web portion a pair of runners 24 for engaging a cylindrical rail 25 mounted along the top of the casing of the disc. The punch 22 is fixed in a cylindrical boss 26 at the end of the rear limb of the member 21, and extends from the boss a distance such as to project through the opening 20 in the rear part 3 of the casing and to engage the rear surface of the disc 1. The anvil 23 is mounted in a similar boss 27 at the end of the front limb of the member 21, but is movable axially of the boss by means of a screw 28 having a square head 29 for receiving a spanner. When it is desired to produce a dimple, the anvil 23 is forced against the disc by tightening the screw 28 so that the tip of the punch 22 is forced into the disc, deforming it into the recessed tip of the anvil. The mounting of the member 21 on the cylindrical rail 25 permits it to swing about the centre of the rail, so that the punch and anvil do not exert any axial thrust on the disc itself, which could lead to distortion. The amount of swing permitted is limited by a stop 30 in the front arm of the member 21, arranged to engage the front part 4 of the casing.

For setting the radial distance at which a dimple is to be formed, so that the appropriate switch will be actuated, a shaft 31 is rotatably mounted in the front limb of the member 21, and carries at its inner end a pinion 32. The pinion 32 can engage a rack 33 mounted on the front part 4 of the casing, and a setting handle 34 is mounted on the end of the shaft by which the pinion can be rotated to cause the member 21 to move along the rail 25 and thus cause the punch and anvil to move radially with respect to the disc. A circular boss 35 is formed on the member 21 around the shaft, and has fourteen sockets 36 equally spaced around its periphery to receive a location peg 37 mounted in the handle 34. Each socket corresponds to the position of the handle when the punch and anvil are in the radial position of one of the switches. The peg 37 is connected to the knob 38 of the handle, and is urged by a spring 39 towards the boss 35 so that when in alignment with one of the sockets it can be moved into the socket by the spring. When it is desired to change the position of the punch and anvil the knob 38 is pulled outwardly to disengage the pin from the socket, after which the handle may be rotated to another position. A disc 40 is mounted on the boss 35 and carries markings indicating the switch corresponding to each socket 36, or the operation performed by actuation of that switch. FIGURE 3 shows, in chain dotted lines, the fourteen positions in which dimples 16 may be formed in the disc, corresponding to the fourteen possible positions of the handle, 34.

A stop 41 is mounted at the radially outermost end of the rack 33 to prevent the pinion running off the rack, and to permit the member 21 to be fitted to and removed from the control device the rack is spaced from the front part 4 of the casing by a spacer member 42 somewhat greater in thickness than the pinion 32, and the shaft 31 is axially slidable in the member 21 a distance likewise somewhat greater than the thickness of the pinion, so that the pinion can be moved axially out of engagement with the rack. The spacer member 42 projects above the rack throughout the major part of its length so as to permit such axial movement of the pinion only when the member 21 is in its radially outermost position. For this purpose, and for accurately locating the member 21 in its outermost position, the upwardly projecting part of the spacer member has a concave profile 43 at its radially outer end, of radius equal to the tooth tip radius of the pinion, and the profile is set in a position such as to be just clear of the inner edge of the pinion when the latter is rotated, in a clockwise direction when viewed from the front, as in FIGURE 3, through one-fourteenth of a revolution from the position shown in that figure. Thus, when the handle 34 is rotated in a clockwise direction as viewed in FIGURE 3 from the position shown to bring the location peg 37 into alignment with the next socket 36 the pinion 32 will be brought clear of the profiled end 43 of the spacer member 42 and the shaft may then be moved axially inwardly to disengage the pinion from the rack whereupon the whole of the dimple-forming attachment can be slid off the rail 25 and removed from the control device. Likewise, for fitting the attachment, the handle 34 is first set in the position just mentioned, that is, rotated clockwise to bring its peg 37 into engagement with the first socket from the uppermost position and the attachment is then fitted to the end of the rail 25 with the handle pushed inwardly and is then slid along the rail until the pinion engages the profile 43. The attachment will then be positioned with the teeth of the pinion in alignment with the spaces between the teeth of the rack and the shaft can be drawn outwardly to engage the pinion with the rack. The knob 38 can then be pulled outwardly to withdraw the peg 37 from the socket and the handle can be rotated to bring the peg into alignment with any other socket and the punch and anvil into the radial position corresponding to the respective switch 9.

With this dimple-forming attachment an operator can produce, in position in the control device, and fitted to the machine, a disc with appropriate dimples for initiating the desired operations of the machine. For this purpose, a plain disc 1 is mounted in the control device and the dimple-forming attachment is mounted as described. The machine is then operated by hand or by other means to perform the desired operations or at least to the positions at which these operations are desired to commence. At each of these positions the dimple-forming attachment is set to bring the punch and anvil into radial alignment with the appropriate switches and a dimple is then formed by rotation of the screw 28 as described. For convenience a torque spanner may be fitted permanently to the square head 29 of the screw 28 so that the same torque is applied to the screw at each operation and the dimples produced are thus of the same depth. Having produced dimples in the desired angular and radial positions on the disc the operator can remove the dimple-forming attachment and swing the plate 8 carrying the switches to its closed position as shown in FIGURES 1 and 2 and the machine can thereafter be caused to perform its desired cycle of operations under the control of the disc. When it is desired to reset the machine to perform a different cycle of operations the deformed disc can be removed and replaced by another disc which, by means of the dimple-forming attachment, can be formed with dimples in positions corresponding to the new cycle of operations. If it is desired later to revert to the first cycle of operations all that is necessary is to replace the first disc in the machine, the angular position of the disc being set by the location peg 2. Thus it will be appreciated that a number of discs may be prepared to provide for different cycles of operation and the machine can be set for any one of these cycles simply by fitting the appropriate disc to the control device, an operation considerably quicker and simpler than the previous methods of fitting a set of cams or a number of trigger members on a rotatable drum. Moreover, the discs, being of small thickness, may readily be stored.

To provide for minor adjustments of the exact instant at which a switch is operated, the switch may be adjustably mounted on the plate 8. Such a provision is shown in the case of the two outermost switches, but could also be made for any of the other switches if necessary. In the case of these two outer switches the brackets 11 on which they are mounted are slidably mounted on the plate 8 by screws 44 so as to move in a direction perpendicular to the radius along which the follower rollers 15 are arranged. Adjusting screws 45 engage the brackets 11, for moving them under the guidance of the screws 44 so as to adjust the angular position of the respective rollers 15 in relation to the disc. Such adjustment is particularly desirable to compensate for delay time in the response of the electric circuit after actuation of the switch. For this purpose the appropriate switch, with its bracket 11, is advanced so that its roller 15 is engaged by a dimple an appropriate time before the operation controlled by the switch is desired to commence. It will be understood that such delay times are of the order of a few micro-seconds, so that only a small amount of adjustment of the bracket 11 is required.

Although in the embodiment described the disc-deforming means is described as a separate attachment removable bodily from the control device it may in alternative embodiments be a permanent part of the device. The former arrangement is preferred, however, since it enables a user of several control devices to provide himself, if desired, with only one dimple-forming attachment which can then be used when required with any of the control devices.

The control device would of course, normally be supplied to a user with a plane disc fitted, so that the user could produce dimples on it as necessary for effecting the desired controls. Spare plane discs would also be made available.

Further, although in the embodiment described the disc is deformed by forming dimples, and corresponding raised portions, which are preferable when only small movement of the follower members are required, as where micro-switches are used, it will be appreciated that other forms of deformaton such as punched holes, or tongues punched and bent from the plane of the disc could be used.

The control device may be supplied as a part of an automatic machine, or as a fixture unit for attachment to an existing machine.

I claim:

1. In a control device for an automatic machine characterized by a rotatable disc of relatively ductile material mounted on a shaft driven by the machine and having a plurality of radially spaced and relatively angularly displaced surface deformations and a row of spaced electric switches for controlling machine operations positioned to be actuated in sequence by said disc deformations, the provision of a fixed support member, means carried by said support member for mounting said switches on said support member for selective movement away from operative positions adjacent the disc to expose the surface of a non-deformed disc to be deformed in situ according to a desired sequence of operations of said machine, means mounting a disc deforming unit for measured displacement substantially radially of said non-deformed disc, and means on said unit for deforming said disc to provide said surface deformations, said disc being so deformed when it has been angularly positioned by the machine in accord with the particular operation and said unit has been displaced to the radial location of the associated switch.

2. In a control device for an automatic machine characterized by a rotatable disc of relatively ductile material mounted on a shaft driven by the machine and having a plurality of radially spaced and relatively angularly displaced surface deformations and a row of spaced electric switches for controlling machine operations positioned to be actuated in sequence by said disc deformations, the provision of means mounting said switches for bodily movement away from the disc to expose the surface of a non-deformed disc to be deformed in situ according to a desired sequence of operations of said machine, means mounting a disc deforming unit for measured displacement substantially radially of said non-deformed disc, and means on said unit for deforming said disc to provide said surface deformations, and said disc being so deformed when it has been angularly positioned by the machine in accord with the particular operation and said unit has been displaced to the radial location of the associated switch, said unit being a generally U-shaped member straddling said disc and being shiftable radially of said disc, said member having aligned punch and die parts disposed on opposite sides of said disc and being selectively actuatable to form said deformations.

3. In a control device for an automatic machine characterized by a rotatable disc of relatively ductile material mounted on a shaft driven by the machine and having a plurality of radially spaced and relatively angularly displaced surface deformations and a row of spaced electric switches for controlling machine operations positioned to be actuated in sequence by said disc deformations, the provision of means mounting said switches for bodily movement away from the disc to expose the surface of a non-deformed disc to be deformed in situ according to a desired sequence of operations of said machine, means mounting a disc deforming unit for measured displacement substantially radially of said non-deformed disc, means on said unit for deforming said disc to provide said surface deformations, and said disc being so deformed when it has been angularly positioned by the machine in accord with the particular operation and said unit has been displaced to the radial location of the associated switch, and means for displacing said unit and including a rack on said unit which is slidably mounted for movement parallel to a radius of said disc, a rotatable pinion meshed with said rack, and a control member for measurably rotating said pinion to position said unit accurately along the radius of the said disc in accord with the spacing of said switches.

4. In a control device for an automatic machine characterized by a rotatable disc of relatively ductile material mounted on a shaft driven by the machine and having a plurality of radially spaced and relatively angularly displaced surface deformations and a row of spaced electric switches for controlling machine operations positioned to be actuated in sequence by said disc deformations, the provision of means mounting said switches for bodily movement away from the disc to expose the surface of a non-deformed disc to be deformed in situ according to a desired sequence of operations of said machine, means mounting a disc deforming unit for measured displacement substantially radially of said non-deformed disc, means on said unit for deforming said disc to provide said surface deformations, and said disc being so deformed when it has been angularly positioned by the machine in accord with the particular operation and said unit has been displaced to the radial location of the associated switch, and means mounting said unit in operative position with respect to said disc only when said switches have been moved to allow access to said disc, and means rendering said unit separable from the rest of said device.

References Cited in the file of this patent

UNITED STATES PATENTS

| | | |
|---|---|---|
| 2,055,031 | Hutchings | Sept. 22, 1936 |
| 2,301,394 | Geissler | Nov. 10, 1942 |
| 2,703,347 | Constantine | Mar. 1, 1955 |
| 2,771,931 | Christensen | Nov. 27, 1956 |
| 2,803,715 | Guth | Aug. 20, 1957 |
| 2,842,627 | Wagner | July 8, 1958 |
| 2,877,317 | Euler et al. | Mar. 10, 1959 |
| 2,966,195 | Roberts et al. | Dec. 27, 1960 |